United States Patent
Katsumoto et al.

(10) Patent No.: US 6,830,644 B2
(45) Date of Patent: Dec. 14, 2004

(54) METHOD OF PRODUCING A LAMINATE USING A HEATED BLOWER

(75) Inventors: Ryuichi Katsumoto, Fujinomiya (JP); Yoshifumi Waki, Fujinomiya (JP); Tadahiro Kegasawa, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 281 days.

(21) Appl. No.: 10/124,244

(22) Filed: Apr. 18, 2002

(65) Prior Publication Data

US 2002/0153089 A1 Oct. 24, 2002

(30) Foreign Application Priority Data

Apr. 19, 2001 (JP) ........................................ 2001-121275

(51) Int. Cl.[7] .............................................. B29C 47/06
(52) U.S. Cl. ............................. 156/244.27; 156/244.11; 156/281; 264/169
(58) Field of Search ............................. 156/244.27, 281; 264/39, 169

(56) References Cited

U.S. PATENT DOCUMENTS

| 3,502,757 A | * | 3/1970 | Spencer ...................... 264/556 |
| RE29,370 E | * | 8/1977 | Sandiford et al. .......... 264/468 |
| 4,370,187 A | * | 1/1983 | Katagiri et al. ........ 156/244.23 |
| 4,917,844 A | * | 4/1990 | Komai et al. ................. 264/85 |

FOREIGN PATENT DOCUMENTS

| JP | 63-246227 | 10/1988 |
| JP | 3-44632 | 2/1991 |
| JP | 2749381 | 2/1998 |

* cited by examiner

*Primary Examiner*—Blaine Copenheaver
*Assistant Examiner*—Barbara J. Musser
(74) *Attorney, Agent, or Firm*—Sughrue Mion, PLLC

(57) ABSTRACT

Rollers, substrates, products and the like are not smeared with a sticky volatile component when a gas is blown from a blower provided near an extruding die to produce laminates. The blower is heated by a heater at a temperature not below the volatilization temperature of the volatile component volatilized from a resin film of thermoplastic resin extruded in molten conditions from the extruding die, and therefore the volatile component cannot stick on the blower and is immediately volatilized on the blower.

2 Claims, 3 Drawing Sheets

METHOD OF PRODUCING A LAMINATE USING A HEATED BLOWER

BACKGROUND OF THE INVENTION

1. Field of the Invention

The present invention relates to an apparatus for producing laminates, and in particular to an apparatus for producing laminates having a blower for blowing a gas near an extruding die.

2. Description of the Related Art

For producing laminates such as substrates for photographic printing paper, an extrusion laminate method (also referred to as extrusion coating method) is widely employed in which a resin film of thermoplastic resin such as polyolefin extruded from an extruding die is applied to a running substrate or web and press-bonded thereto by nipping the film and the substrate together at a nip point located between a nip roller and a cooling roller, thereby laminating the substrate with the resin film.

In the production of laminates, a various kinds of gases are blown from a blower provided near the extruding die for various purposes. For example, Japanese Patent Application Publication No. 63-246227 discloses that a gas that easily permeates through the resin film is blown toward the nip point at which the substrate and the resin film are nipped together in order to alleviate a troublesome situation in which very small pores (hereinafter referred to as "craters") are formed on the surface of the resin film applied to the substrate. In addition, Japanese Patent No. 2749381 discloses that an inert gas is blown toward the surface of the resin film on the cooling roller side to prevent odors, and an acidic gas is blown toward the surface of the resin film on the substrate side to enhance adhesion between the substrate and the resin film.

However, there is a disadvantage that because high-temperature thermoplastic resin is extruded in molten conditions from the extruding die, a volatile component volatilized from the resin film of thermoplastic resin is stuck and accumulated on the blower, and a part of the components is dropped onto the cooling roller, the nip roller, the substrate, the product and the like to smear the roller, product and the like. In particular, if the volatile component is dropped onto the product, not only the appearance but also quality of the product will be damaged. In addition, the volatile component may stick directly to the cooling roller and/or the nip roller to smear the roller.

If the product, roller and the like are smeared with such components, the production line should be stopped on a temporary basis to conduct cleaning, leading to a significant drop in productivity.

SUMMARY OF THE INVENTION

The present invention has been made in view of the above described situation, and its object is to provide a method and apparatus for producing laminates in which the blower, roller, substrate, product and the like are never smeared with a volatile component even in the case where a gas is blown from the blower placed near the extruding die when laminates are produced, thus making it possible to improve the quality and productivity of laminates.

For achieving the above described object, the present inventions is directed to a method for producing a laminate, comprising the steps of: coating a surface of a running substrate with a film of thermoplastic resin extruded in a molten condition from an extruding die; and nipping the substrate and the film together between a nip roller and a cooling roller to produce a laminate while replacing, with a gas blown from a blower placed near the extruding die, air in an area where the nipping is conducted, wherein before the thermoplastic resin is extruded from the extruding die, a volatilization temperature of a volatile component of the thermoplastic resin is determined and the blower is heated at a temperature not below the determined volatilization temperature.

According to the present invention, the volatilization temperature of a volatile component of the thermoplastic resin to be extruded from the extruding die is determined in advance, and the blower is heated at a temperature equal to or higher than the determined volatilization temperature before the thermoplastic resin is extruded from the extruding die, thus making it possible to prevent the volatile component of the thermoplastic resin from sticking to the blower for blowing the gas, which may improve adhesion between the substrate and the resin film or may prevent craters from being formed in the resin film, when a laminate is produced. Thereby, when a laminate is produced, the blower, roller, substrate, product and the like are not smeared with the volatile component even in the case where the gas is blown from the blower placed near the extruding die.

For the method for determining the volatilization temperature of the volatile component of thermoplastic resin, a measuring device may be used to actually measure the volatilization temperature, or a handbook of chemistry or the like may be consulted to determine the volatilization temperature referring to the components contained in the thermoplastic resin.

Preferably, the gas blown from the blower is heated at a temperature not below a temperature (° C.) determined by subtracting 150 (° C.) from the temperature (° C.) at which the blower is heated. Thereby, a drop in temperature of the blower by the blowing of the gas is prevented, and the volatile component is prevented from sticking to the blower more reliably.

For achieving the above described object, the present invention is also directed to a laminate producing apparatus, comprising: an extruding die which extrudes a thermoplastic resin in a molten condition and coats a surface of a running substrate with a film of the thermoplastic resin; a nip roller and a cooling roller which nip the substrate and the film together; a blower which blows a gas around the extruding die; and a blower heater which heats the blower at a temperature not below a volatilization temperature of a volatile component of the thermoplastic resin.

According to the present invention, the blower is heated at a temperature equal to or higher than the volatilization temperature of the volatile component volatilized from the thermoplastic resin extruded in molten conditions from the extruding die by the blower heater, so that the volatile component is immediately volatilized without sticking to the blower. Thereby, the volatile component is prevented from sticking to the blower.

Preferably, the laminate producing apparatus further comprises a gas heater which heats the gas to be blown through the blower at a temperature not below a temperature (° C.) determined by subtracting 150 (° C.) from the temperature (° C.) at which the blower is heated. Thereby, a drop in temperature of the blower by the blowing of the gas is prevented, and the volatile component is prevented from sticking to the blower more reliably.

For achieving the above-described object, the present invention is also directed to a laminate producing apparatus, comprising: an extruding die which extrudes a thermoplastic resin in a molten condition and coats a surface of a running substrate with a film of the thermoplastic resin; a nip roller and a cooling roller which nip the substrate and the film together; a blower which blows a gas around the extruding die, wherein a nozzle provided in a blowing face of the blower is located at a distance of at least 15 mm from an edge of the blowing face.

When a gas is blown from the nozzle, a negative pressure is provided in the surroundings of the nozzle to suck therein the air around the blower more easily, and thus the blower, rollers located near the blower and the product tend to be smeared with the volatile component. According to the present invention, the apparatus is configured to prevent this situation. Specifically, the nozzle is located at a distance of 15 mm or greater from the edge of the blowing face, thus preventing more reliably the surroundings of the blower from being influenced by the negative resulting from the blowing of the gas from the nozzle.

Preferably, at least one of a surrounding member and a brim-shaped member is provided on a periphery of the blowing face and surrounds the nozzle, so that the surroundings of the blower are hardly influenced by the negative pressure resulting from the blowing of the gas.

Preferably, a flow rate of the gas blown from the blower is not more than 50 mm/second.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a method and apparatus for producing laminates according to the present invention will be described in detail below in accordance with the attached drawings.

Figure 1:
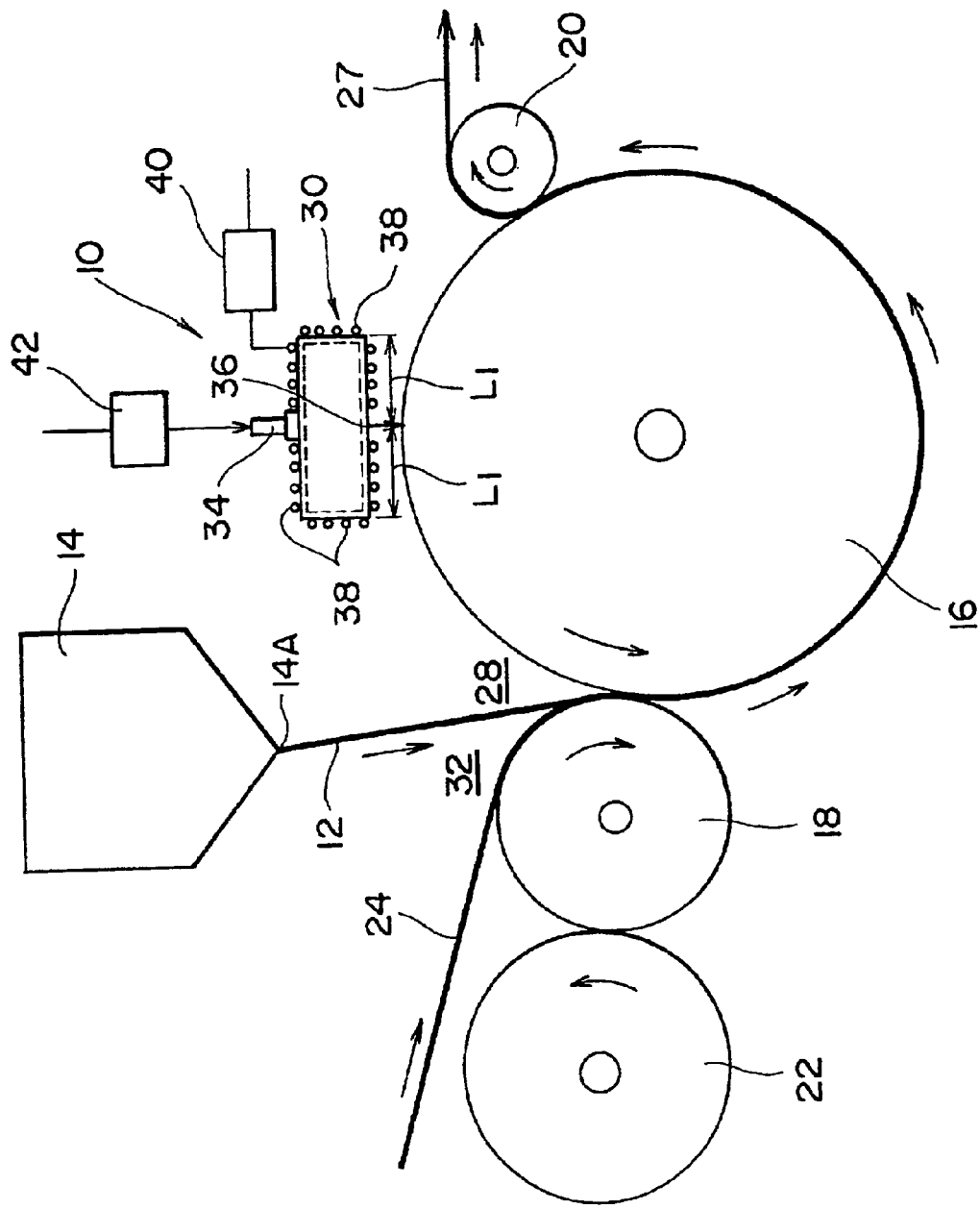
FIG. 1 is a conceptual block diagram of an apparatus for producing laminates according to an embodiment of the present invention.
Figure 2:
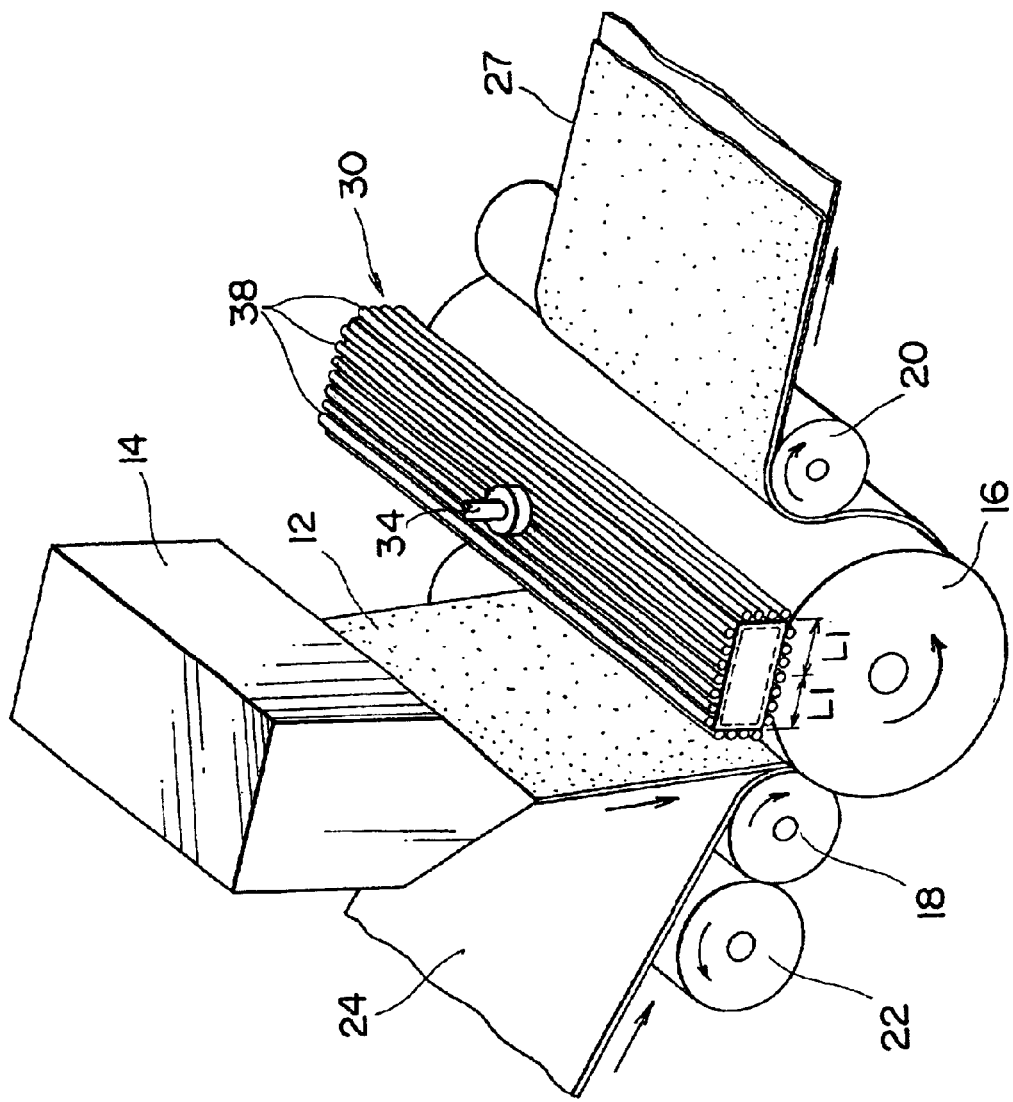
FIG. 2 is a perspective view of the apparatus in FIG. 1.

FIG. 1 is a block diagram conceptually illustrating a general configuration of an apparatus 10 for producing laminates according to an embodiment of the present invention, and FIG. 2 is a perspective view thereof.

As shown in FIGS. 1 and 2, a cooling roller 16 and a nip roller 18 are placed in such a manner that they are parallel and adjacent to each other below an extruding die 14 from which a resin film 12 of thermoplastic resin is extruded in molten conditions, and a release roller 20 is placed in such a manner that it is parallel and adjacent to the cooling roller 16 on the opposite side of the nip roller 18 with the cooling roller 16 therebetween. In addition, a backup roller 22 is provided on the opposite side of the cooling roller 14 with the nip roller 18 therebetween. A running strip substrate (web) 24 is nipped at a nip point where the cooling roller 16 contacts the nip roller 18 while being coated with the resin film 12 extruded from the extruding die 14. The substrate 24 coated with the resin film 12 is cooled by running while the resin film applied thereon is in contact with the surface of the cooling roller 16, and is separated from the cooling roller 16 by the release roller 20. In this way, a laminate 27 is produced.

A blower 30 for blowing a gas is placed near the extruding die 14. The blower 30 may play a role to blow a gas capable of permeating the resin film 12 such as $CO_2$ gas, $O_2$ gas, $H_2O$ gas and He gas into an area 28 surrounded by the resin film 12 of thermoplastic resin extruded from the extruding die 14 and the cooling roller 16 to prevent generation of craters in the resin film 12. In this case, the blower 30 is placed above the cooling roller 16. In the case where oxidation of the resin film 12 is required for enhancing adhesion between the resin film 12 and the substrate 24, an oxidizing gas such as $O_3$ gas is blown into an area 32 surrounded by the resin film 12 extruded from the extruding die 14 and the nip roller 18. In this case, the blower 30 is placed above the nip roller 18. Inversely, in the case where the resin film 12 for use in food packaging or the like is produced, a non-oxidizing gas such as $N_2$ gas is blown to prevent oxidization of the resin film 12 for preventing a bad odor from being given off. In this case, the blower 30 is placed above the cooling roller 16 or the nip roller 18. In any case, the air is not used as a blown gas in this embodiment.

Thus, the location of the blower 30 and the type of gas to be blown varies depending on the role of the blower 30, and in this embodiment, an example of the blower for preventing generation of craters in the resin film 12 will be described, but the blower is not limited thereto, and it may be a blower for oxidizing of the resin film 12 or preventing oxidation of the resin film 12.

Figure 3A:
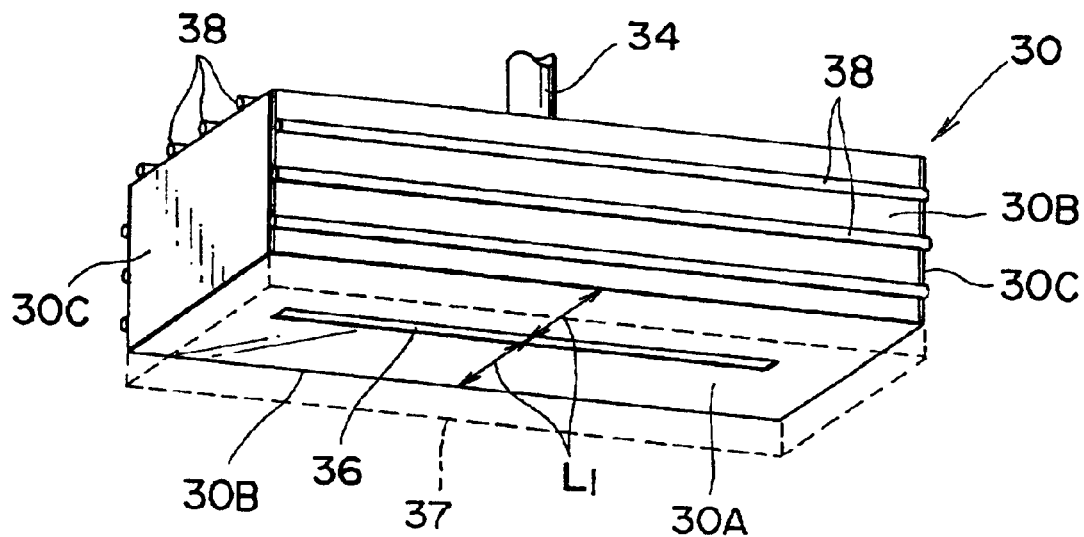
FIGS. 3(a) and 3(b) are perspective views of the structure of a blower taken aslant from the lower side.
Figure 3B:
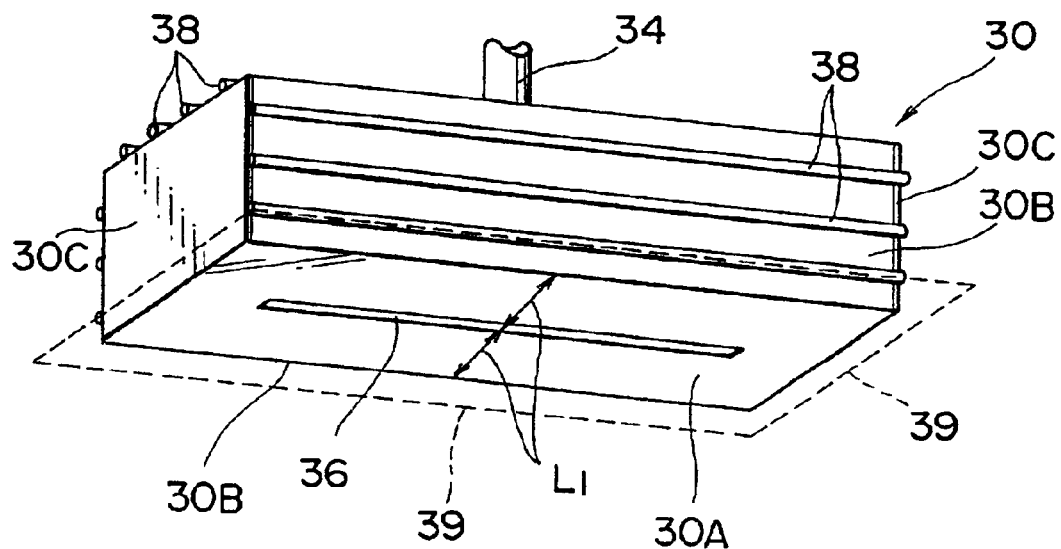

As shown in FIGS. 3(a) and 3(b) taken aslant from the lower side, the structure of the blower 30 is a hollowed rectangular parallelepiped, to the upper surface of which a gas supply pipe 34 for supplying a gas into the blower 30 is connected, and in the lower surface (hereinafter referred to as "blowing face 30A" of which a slot nozzle 36 is formed in the direction along the axis of the cooling roller 16. The gas permeating the resin film 12 such as $CO_2$ gas supplied into the blower 30 from the gas supply pipe 34 is compressed in the blower 30 and blown toward the cooling roller 16 from the nozzle 36. The blown gas is transported to the area 28 surrounded by the resin film 12 and the cooling roller 16 in company with the rotation of the cooling roller 16. Thereby, the air in the area 28 is replaced with the gas, and unlike the air, the replacing gas never abuts against the resin film 12 to form craters because it permeates the resin film 12. In addition, even if craters are formed in the resin film 12, the gas permeates through the resin film while lamination is conducted because the recess of the crater is filled with highly permeative gas, and thus the craters are easily eliminated. Thereby, craters formed before the substrate 24 is coated with the resin film 12 can be eliminated during lamination. As a result, craters are prevented from being formed in the resin film 12 of the laminate 27. The structure of the blower 30 is not limited to a hollowed rectangular parallelepiped, but may be a double pipe structure, and in fact, any structure allowing a gas to be blown toward the cooling roller 16 may be used.

In addition, the nozzle 36 of the blower 30 is set so that the distance ($L_1$) between itself and the edge of the blowing face 30A, namely the lower edge of the longitudinally extending side faces 30B (side faces parallel to the nozzle 36) of four side faces of the blower 30 is 15 mm or greater. In this way, by placing the nozzle 36 at a distance of at least 15 mm from the edge of the blowing face 30A, it can be made difficult for the volatile component volatilized from the resin film 12 extruded from the extruding die 14 to be driven toward the blower 30. Specifically, when the gas is blown from the nozzle 36, a negative pressure is provided in surroundings thereof to suck the air in the surroundings of the blower 30 more easily, and thus the volatile component is easily stuck on the blower 30 and the cooling roller 16 placed near the blower 30. However, the nozzle 36 is located at a distance of 15 mm or greater from the edge of the blowing face 30A to keep the nozzle 36 away from the area in which a volatile component is generated, thereby making it possible to prevent the volatile component from being easily influenced by the negative pressure resulting from the blowing the gas from the nozzle 36. In addition, the amount of generated volatile component is the largest near a discharge outlet 14A of the extruding die 14 at which the temperature of the resin film 12 is high, but the blower 30 shelters the nozzle 36 against the discharge outlet 14A of the extruding die 14, thus making it possible to prevent the volatile component from being easily influenced by the negative pressure resulting from the blowing of the gas from the nozzle 36. In this case, the distance ($L_1$) from at least the lower edges of the longitudinal extending side faces 30B of four side faces of the blower 30 should be 15 mm or greater. In addition, it is still further preferable that a surrounding wall 37 is provided around the blowing face of the blower 30 in such a manner as to surround the nozzle 36 as shown with dotted lines in FIG. 3(*a*), or a brim-shaped wall 39 is mounted as shown with dotted lines in FIG. 3(*b*). In this case, the temperature of the hanging wall 37 or the brim-shaped wall 39 is preferably kept at the same temperature with the blower 30.

In addition, a heater 38 is provided in the blower 30 for heating the blower 30 at a temperature equal to or higher than the volatilization temperature of the volatile component volatilized from the resin film 12. The heater 38 is connected to a power supply (not shown) through a temperature controller 40 including a sensor such as a thermocouple. Then, the temperature at which the blower 30 is heated is adjusted depending on the volatilization temperature of the volatile component volatilized from the resin film 12. Thereby, even if the volatile component of the resin film is stuck to the blower 30, the volatile component is immediately volatilized from the blower 30 because the blower 30 is heated at a temperature equal to or higher than the volatilization temperature of the volatile component. Therefore, there are no possibilities that the volatile component is stuck and accumulated on the blower 30. The heater 38 may be located outside the blower 30 as shown in FIGS. 1 and 2, or it may be located inside the blower 30 (not shown). However, in the case where the heater 38 is located inside the blower 30, it is preferable that the heater 38 is enclosed and isolated from the blown gas so that the heater 38 does not directly contact the blown gas. Thereby, erosion of the heater 38 by the blown gas and the like can be prevented, thus making it possible to prolong the lifetime of the heater 38.

As shown in FIG. 1, a gas heater 42 for heating the blown gas is placed at some midpoint of the gas supply pipe 34 for supplying the blown gas to the blower 30 as an additional measure for preventing the volatile component from being stuck to the blower 30. Thereby, it is possible to prevent a drop in temperature of the blower 30 resulting from the blowing of gas. Specifically, even through the blower 30 is purposely heated at a temperature equal to or higher than the temperature of the volatile component, the blower 30 will be deprived of heat by the blown gas to cause a drop in temperature of the blower 30 near the nozzle 36 and the volatile component will be more easily stuck and accumulated on the temperature-dropped portion of the blower 30 if the temperature of the gas blown from the blower 30 is low. Hence, the blown gas is heated to prevent a drop in temperature of the blower 30. For this purpose, the relationship between the temperature at which the blower 30 is heated by the heater 38 and the temperature at which the blown gas is heated by the gas heater 42 may be defined so that the temperature at which the gas is heated is equal to or higher than a temperature (° C.) determined by subtracting 150 (° C.) from the temperature (° C.) at which the blower 30 is heated. That is, the blown gas is heated for the purpose of preventing the blower 30 from being smeared on an adjunctive basis, and therefore it is not necessary to increase the temperature of the blown gas to above the temperature of the volatile component. However, if the temperature of the blown gas is much lower than that of the blower 30 by 150° C. or more, the blower 30 will be cooled, thus rising a situation in which the blower 30 is easily smeared, even though the blower 30 is purposely heated. For this reason, if the temperature of the blown gas is lower than that of the blower 30, it is preferable that the former is made close to the latter as much as possible, but as described above, it is more preferable that a difference in temperature between the blown gas and the blower 30 is 150° C. or smaller, further preferably 50° C. or smaller. If the temperature of the blown gas is low such that the difference in temperature between the blown gas and the blower 30 exceeds 150° C., the blower 30 is smeared with the volatile component in short time, and the effect of heating the blower 30 is compromised. The upper limit of the temperature of the blown gas is not particularly defined, but heating the blown gas more than necessary is not recommendable because energy is consumed in vain, and risks such as ignition may arise if the blown gas is heated at a temperature equal to or higher than the ignition point of the volatile component (420° C. for the thermoplastic resin used in Examples described later). In addition, the cooling ability of the cooling roller 16 can be reduced, and therefore the heating of the blown gas should be controlled while a drop in temperature of the blower 30 is prevented. In this connection, although there is also a method in which a high-output heater 38 is used to prevent a drop in temperature of the blower 30 without heating the blown gas, the method in which the blown gas is heated is more preferable from a viewpoint of total energy.

In addition, because the flow rate of the gas blown from the blower 30 has an influence on the magnitude of a force to drive the above volatile component toward the blower 30, and a drop in temperature of the blower 30 near the nozzle 36, the flow rate of the gas blown from the nozzle 36 is preferably kept at 50 m/second or lower. Thereby, the negative pressure resulting from the gas being blown from the nozzle 36 can be reduced, and a drop in temperature of the blower 30 near the nozzle 36 can be curbed. As effective measures for reducing the flow rate of the blown gas, the clearance of the nozzle 36 is widened, the flow of the gas supplied to the blower 30 is decreased, and so on.

For using the apparatus 10 for producing laminates having a configuration described above to produce laminates, the surface of the running substrate 24 is coated with the resin film 12 of thermoplastic resin extruded in molten conditions from the extruding die 14, followed by nipping the substrate 24 and the resin film 12 together by the nip roller 18 and the cooling roller 16, and blowing a gas capable of permeating the resin film from the blower 30 toward the cooling roller 16 to replace with the gas the air in an area surrounded by the resin film 12 and the cooling roller 16.

In this method for producing the laminate 27, the volatilization temperature of the volatile component of the thermoplastic resin to be extruded from the extruding die 14 is determined in advance, and the blower 30 is heated at a temperature equal to or higher than the above described determined volatilization temperature before the thermoplastic resin is extruded from the extruding die 14. In this case, for the method for determining the volatilization temperature of the volatile component of the thermoplastic resin, a measuring device (not shown) may be used to actually measure the volatilization temperature, or a handbook of chemistry or the like may be consulted to determine the volatilization temperature referring to the components contained in the thermoplastic resin.

In this way, in the method and apparatus for producing laminates according to the present invention, the volatile component volatilized from the resin film 12 extruded from the extruding die 14 is hard to be stuck to the blower 30, and therefore there are no possibilities that the volatile component stuck and accumulated on the blower 30 is dropped onto the cooling roller 16 and the laminate 27 as a product to smear the same as in the conventional methods and apparatuses. Thus, the quality of the laminate 27 can be improved, and productivity can be enhanced because it is not necessary to conduct frequently cleaning of the cooling roller 16 and the like.

The technical concept of the present invention can be applied not only to production of laminates 27 using the extruding die 14, but also to cases where the volatile component is stuck to the blower 30, for example cases where an air curtain is created near the resin film, where a dry air for drying the resin film is blown from the blower 30, and where a heated air for thermal treatment of the resin film is blown from the blower 30.

EXAMPLE

Results of comparison of Examples of apparatuses for producing laminates comprising blowers of the present invention with Comparative Examples of apparatuses for producing laminates comprising conventional blowers will be described below. The extruding die, cooling roller, nip roller, backup roller and release roller in Examples were the same as those in Comparative Examples, except for the blower. In both Examples and Comparative Examples, the volatilization temperature and ignition point of the volatile component of thermoplastic resin extruded form the extruding die were 230° C. and 420° C., respectively.

Comparative Example 1

For the blower used in Comparative Example 1, a blower having a stainless steel rectangular pipe with a diameter of 25 mm and a wide of 80 mm arranged in the axial direction of the cooling roller was used, and a slot nozzle with a clearance of 0.2 mm was provided on the blowing face of the blower. In this case, the nozzle was placed at a distance of about 12.5 mm from the edge of the blowing face. In addition, the flow rate of the blown gas was kept at 60 m/second, and the blower and gas were kept at a room temperature.

For the conditions for extrusion lamination, polyethylene with a plurality of additives (pigment, dispersant, antioxidant, etc.) added therein was extruded from the extruding die at a temperature of 300° C., and was applied to the substrate at a line speed (substrate transportation speed) of 150 m/minute so that the resin film was formed on the substrate in thickness of 30 μm.

Comparative Example 2

Lamination was carried out in the same manner as Comparative Example 1 except that the blower was heated at a temperature of 200° C.

Example 1

In Example 1, the same nozzle as that of Comparative Example 1 was placed at a distance of about 12.5 mm from the edge of the blowing face, and heaters as well as thermocouples were provided in a plurality of positions outside the blower, and the temperature was controlled so that the blower was kept at a temperature of 350° C. In addition, a gas was blown from the blower at a flow rate of 50 m/second, and the blown gas was heated at 200° C., which is lower than the temperature of the blower by 150° C.

Example 2

In Example 2, lamination was carried out in the same manner as Example 1 except that the diameter of the blower was increased so that the nozzle was placed at a distance of 15 mm from the edge of the blowing face.

Example 3

In Example 3, lamination was carried out in the same manner as Example 1 except that the clearance of the nozzle of the blower was increased to 0.4 mm so that the flow rate of the blown gas was 30 m/second.

Example 4

Lamination was carried out in the same manner as Example 1 except that the blower was kept at a temperature of 250° C., which was slightly higher than the volatilization temperature (230° C.) of the volatile component of the thermoplastic resin.

Results

In Comparative Example 1, oily matters being a volatile component of the resin film started to stick to the blower 5 minutes after extrusion lamination from the extruding die was started, and after ten minutes, sticky matters stuck and accumulated on the blower were dropped onto the cooling roller to smear the roller. Then, in addition to the aforesaid sticky matters dropped from the blower, sticky matters were further stuck to the cooling roller, and one hour after the lamination was started, the entire surface of the cooling roller was smeared with sticky matters.

Also, in Comparative Example 2, sticky matters started to stick to the blower two hours after extrusion lamination from the extruding die was started. In Comparative Example 2, a situation was improved compared to Comparative Example 1, but a satisfactory result was not provided yet because the temperature of the blower was 200° C., which was lower than the volatilization temperature (230° C.) of the volatile component.

On the other hand, in Example 1, the blower was not smeared with oily sticky matters being a volatile component of the resin film even ten hours after the extrusion lamination was started. However, sticky matters were stuck on the cooling roller.

In Examples 2 and 3, neither the blower nor the cooling roller was smeared with oily sticky matters being a volatile component even ten hours after the extrusion lamination was started.

Also, in Example 4 in which the temperature of the blower was set at 250° C., which was slightly higher than the volatilization temperature (230° C.) of the volatile component, a slight amount of oily sticky matters existed on the blower ten hours after the extrusion lamination was started, but those stuck matters were not dropped onto the cooling roller. This result was slightly inferior to those of Examples 1 to 3, but was much superior to those of Comparative Examples 1 and 2.

CONCLUSIONS

From the above results, the problem of the volatile component being stuck to the blower can be solved by heating the blower at a temperature equal to or higher than the volatilization temperature of the volatile component, further preferably making a setting so that the temperature (° C.) of a blown gas is not below the temperature (° C.) that is under the temperature (° C.) of the blower by 150 (° C.).

In addition, as apparent from comparison of Example 1 with Examples 2 and 3, the distance of about 12.5 mm between the nozzle and the edge of the blowing face is not sufficient to prevent the volatile component existing around the blower from being sucked, and as a result the cooling roller near the blower is smeared (Example 1), but members placed near the blower and the apparatus can be prevented from being smeared by increasing the distance to 15 mm or greater (Examples 2 and 3).

As described above, in accordance with the method and apparatus for producing laminates according to the present invention, the roller, substrate, product and the like are not smeared with the volatile component even in the case where a gas is blown from the blower provided near the extruding die when laminates are produced. Thereby, the quality of laminates produced by extrusion lamination can be improved, and a long run of extrusion lamination can be conducted stably, thus making it possible to enhance productivity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for producing a laminate, comprising the steps of:

coating a surface of a running substrate with a film of thermoplastic resin extruded in a molten condition from an extruding die; and nipping the substrate and the film together between a nip roller and a cooling roller to produce a laminate while replacing, with a gas blown from a blower placed near the extruding die, air in an area where the nipping is conducted, wherein before the thermoplastic resin is extruded from the extruding die, a volatilization temperature of a volatile component of the thermoplastic resin is determined and the blower is heated at a temperature not below the determined volatilization temperature, wherein the blower blows the gas which has a temperature which is not above the temperature of the blower itself, and wherein the blower and the gas separately are heated by respective heaters.

2. The method according to claim 1, wherein the gas blown from the blower is heated, prior to entering the blower, to a temperature that is greater than or equal to a temperature (° C.) determined by subtracting 150 (° C.) from the temperature (° C.) of the blower.

* * * * *